No. 675,846. Patented June 4, 1901.
A. BENSON.
MOTOR.
(Application filed Nov. 4, 1899.)
(No Model.)
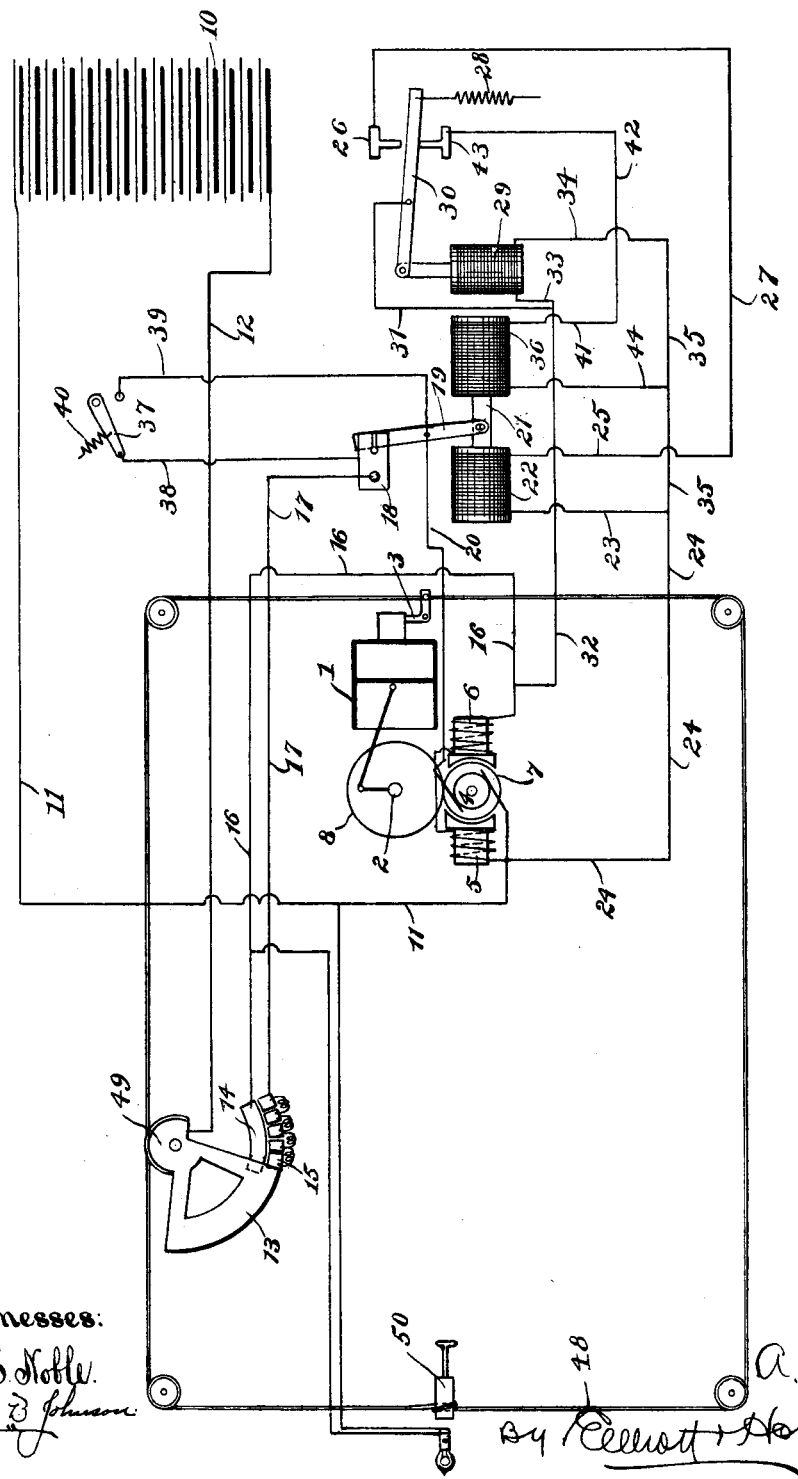
Witnesses:
J. S. Noble.
Edna B. Johnson
Inventor,
A. Benson
By Elliott + Hopkins
Att'ys.

UNITED STATES PATENT OFFICE.

ANDREW BENSON, OF CHICAGO, ILLINOIS, ASSIGNOR OF THREE-FOURTHS TO ROBERT P. PRICE AND JOHN P. PRICE, OF SAME PLACE, AND JOHN B. BENSON, OF MARINETTE, WISCONSIN.

MOTOR.

SPECIFICATION forming part of Letters Patent No. 675,846, dated June 4, 1901.

Application filed November 4, 1899. Serial No. 735,747. (No model.)

*To all whom it may concern:*

Be it known that I, ANDREW BENSON, a citizen of the United States, residing at No. 53 River street, in the city of Chicago, county of Cook, and State of Illinois, have invented certain new and useful Improvements in Motors, of which the following is a full, clear, and exact specification.

My invention relates to a combined electrical and mechanical motor or engine; and it has for its primary object to provide improved means whereby the electric motor may be utilized for starting the engine and the latter utilized for operating the electric motor as a dynamo and storing electricity for use in either starting the engine or assisting or substituting the latter in the work it has to do.

Another object of my invention is to provide improved means whereby the electrical apparatus when working as a dynamo will automatically cut itself out of the storage-battery circuit when the battery becomes fully charged.

A further object of the invention is to provide a construction whereby the electric motor cannot be started without automatically opening the supply-valve to the engine, and such supply-valve cannot be shut off or partially shut off without breaking or correspondingly resisting the current to the motor, thereby providing a means for controlling either the motor or the engine, or both, by one and the same operation or act on the part of the operator.

With these ends in view my invention consists in certain features of novelty in the construction, combination, and arrangement of parts by which the said objects and certain other objects hereinafter appearing are attained, all as fully described, with reference to the accompanying drawing, and more particularly pointed out in the claims.

The said drawing is a diagrammatic illustration of an electric and mechanical motor and the various circuits and controlling devices embodying my invention.

The greatest field of usefulness for my invention is that which includes the art of automobiles or motor-vehicles, and on such devices it is desirable, for reasons too well known to require explanation, to employ gasolene or equivalent explosive fluid as a motive power. Hence the mechanical motor which I have shown in connection with the electric motor is of the gasolene type.

1 represents the cylinder of the gasolene-engine; 2, the crank-shaft; 3, a speed regulator or lever which controls or regulates the opening of the fuel-gas-inlet valve or valves thereof, and 4 is the armature of the electric motor, of which 5 6 are the field-magnets and upon the shaft of which armature is secured a pinion 7, which meshes with a gear-wheel 8 on the crank-shaft 2, thereby making the armature subserve as a fly-wheel for the gas-engine, or otherwise stated the fly-wheel of the gas-engine serves as an armature-core for the electric motor, and by being geared to the shaft by multiplying-gears in this manner enables the employment of a much smaller and lighter fly-wheel for an engine of a given horse-power than heretofore feasible.

10 is a storage battery whose negative pole is connected by conductor 11 with the positive pole of the motor or dynamo, which is of the shunt-wound type, while the positive pole of the battery 10 is connected by conductor 12 with a controller or switch 13, which is adapted to overlap a plain contact 14 and also over any number of a series of resistance-contacts 15 of the usual or any suitable rheostat. The plain contact 14 is elongated, so that the controller 13 will first connect with it and will remain in contact therewith as long as in contact with any of the contacts 15, and such contact 14 is connected by conductor 16 to the helix of field-core 6, while the series of contacts 14 is connected by conductor 17 with an isolated contact 18, with which is adapted to contact a circuit-closer 19, connected by conductor 19ª with the negative pole of the motor or dynamo, so that when the circuit-closer 19 is in contact with the contact 18 and the controller 13 in contact with one or more of the contacts 15 the current will flow from the storage battery 10 along the conductor 12 to the controller 13, then through the resistances 15, included in the circuit, along the conductor 17 to the contact 18 and to the negative pole of the motor or dynamo via 19 and 20, and returns to the battery via conductor 11, thereby rotating the armature 4 and imparting movement to the engine-piston through the intermediary of the connections already described, thus starting the gas-engine, which will in turn react on the armature-shaft, and as soon as its speed becomes sufficient the motor will become a dynamo and begin to generate a current in the armature-coils and send it to the battery along the conductors 11 16 20, but in the reverse direction of that already described with reference to the direction of current when used for actuating the electric motor. The current will continue to flow to the battery as long as the engine operates and until the battery becomes fully charged, whereupon the circuit to the battery is automatically broken at 18 19 by the circuit-closer 19 moving to the right. This movement of the circuit-closer 19 is accomplished by connecting the latter (which is shown in the drawing in the form of a pivoted bar or lever) to the core 21 of a solenoid or magnet 22, whose terminal 23 is connected to the battery 10 by conductor 24, while its terminal 25 is connected to an isolated contact 26 by conductor 27, so that when the current passes through the solenoid 22 the circuit at 18 19 will be broken. This cannot occur, however, until the current becomes strong enough to overcome (through the agency of a magnet or solenoid 29) a spring or resistance 28, acting to restrain a circuit-closer 30 from contacting with the contact 26, the circuit-closer 30 being connected by conductor 31 to conductor 32, which is in turn connected to conductor 16 and the terminal 33 of the helix 29 being also connected to conductor 32, while its terminal 34 is connected by conductor 35 to the conductor 24. Thus it will be seen that a full charge in the storage battery will automatically cut the battery out of circuit; but as soon as the charge is reduced below a certain tension a magnet or solenoid 36, into which one end of the core or armature 21 projects, will throw the circuit-closer or cut-out 19 back into engagement with the contact 18 and again place the battery in circuit with the motor or dynamo. This will be accomplished automatically by any reduction in the battery charge from whatever cause, such as the use of the charge for illuminating purposes or igniting the gas in the gas-engine; but for the sake of convenience and certainty there may be employed a hand-operated circuit-closer 37, connected by conductors 38 39 to contact 18 and circuit-closer 19, respectively, so that by closing the switch or circuit-closer 37 the battery-voltage may soon be reduced sufficiently to actuate the solenoid or magnet 36 and shift the circuit-closer 19 into engagement with its companion contact 18, the switch 37 being held normally open, if desired, by a spring 40 or other means, so that when the apparatus is used on a vehicle the possibility of the switch 37 being allowed to remain closed and the charge drained away will be avoided. This operation of the solenoid or magnet 36 is effected in the following manner: One terminal 41 of the solenoid 36 is connected by conductor 42 to a contact 43, with which the circuit-closer 30 is held normally in contact by the spring 28, while the other terminal 41 of solenoid 36 is connected to conductor 35. Hence as soon as resistance of the spring 28 exceeds the strength of the solenoid 29 the circuit will be closed through solenoid 36 via 41, 42, 43, 30, 31, 32, 16, 14, 13, and 12 on one side and 44, 35, 24, and 11 on the other side, and the electrical machine will be in readiness to be used as either a motor or a dynamo as the exigencies of the case may require.

45 represents an electric lamp connected by conductors 46 47 to the conductors 11 16, respectively, which may be utilized as a headlight or for any other desired purpose when the invention is employed as motive power for a vehicle.

The controller 13 is actuated from the operator's post by a cord 48 or other suitable connection, which is also connected to the lever 3, which controls the supply-valve of the engine, the cord 48 being attached at each end to the lever 3 and wound around a drum 49 on the controller 13 and also around a hand-operated drum 50, arranged at a convenient point, so that by turning the drum 50 the motor will be thrown into circuit and the supply-valve of the engine simultaneously opened, or vice versa, thus making it impossible to start the electric motor without giving the engine its proper supply of fuel or gas.

It will be understood that the use of reference numerals or characters in the claim is resorted to for the sake of clearness and not for the purpose of specifying the particular construction of the elements referred to thereby.

The automatic cut-out mechanism herein shown and described, but not claimed, constitutes the subject-matter of the claims in my application, Serial No. 741,559, filed December 26, 1899.

Having thus described my invention, what I claim as new therein, and desire to secure by Letters Patent, is—

The combination of an engine having a speed-regulator, a dynamo or motor mechanically connected with the engine-shaft, a storage battery, a controller for varying the current between the battery and the motor and an operative connection between said controller and speed-regulator of the engine, substantially as set forth.

ANDREW BENSON.

Witnesses:
EDNA B. JOHNSON,
F. A. HOPKINS.